US012675746B1

(12) United States Patent　　　　(10) Patent No.:　US 12,675,746 B1
West et al.　　　　　　　　　　　　　(45) Date of Patent:　　　Jul. 7, 2026

(54) SIGNAL DETECTION USING MACHINE LEARNING MODELS

(71) Applicant: DeepSig Inc., Arlington, VA (US)

(72) Inventors: Nathan West, Washington, DC (US); Tamoghna Roy, Alexandria, VA (US); Daniel DePoy, Alexandria, VA (US); Timothy James O'Shea, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 687 days.

(21) Appl. No.: 18/113,354

(22) Filed: Feb. 23, 2023

Related U.S. Application Data

(60) Provisional application No. 63/312,991, filed on Feb. 23, 2022.

(51) Int. Cl.
　　　*G06N 20/20*　　　　　(2019.01)
(52) U.S. Cl.
　　　CPC ................................... *G06N 20/20* (2019.01)
(58) Field of Classification Search
　　　CPC ..................................................... G06M 20/20
　　　USPC .......................................................... 706/12
　　　See application file for complete search history.

(56) References Cited

U.S. PATENT DOCUMENTS

| | | | | |
|---|---|---|---|---|
| 2020/0352466 A1* | 11/2020 | Chakravarthy | ...... | A61N 1/3621 |
| 2022/0393781 A1* | 12/2022 | Kim | ........................ | G06N 3/08 |
| 2023/0188233 A1* | 6/2023 | Gupta Hyde | ...... | H04B 17/3913 |
| | | | | 370/329 |
| 2023/0199565 A1* | 6/2023 | Vannithamby | ..... | H04B 17/3913 |

OTHER PUBLICATIONS

Riyaz, et al., "Deep learning convolutional neural networks for ratio identification", IEEE Communications magazine, Sep. 2018 (Year: 2018).*

Kulin, et al., "End-to-end learning from spectrum data: a deep learning approach for wireless signal identification in spectrum monitoring applications", IEEE Access, vol. 6, 2018 (Year: 2018).*

Bkassiny, et al., "A survey on machine-learning techniques in cognitive radios", IEEE communications surveys & tutorials, vol. 15, No. 3, 2013 (Year: 2013).*

* cited by examiner

*Primary Examiner* — Tsu-Chang Lee
(74) *Attorney, Agent, or Firm* — Fish & Richardson P.C.

(57)　　　　　　　　ABSTRACT

Methods, systems, and apparatus, including computer programs encoded on computer-storage media, for signal detection using machine learning models. In some implementations, a method includes obtaining communications data comprising one or more radio signals; providing the communications data to a first machine learning model that is trained to detect frequency bands that likely include radio signals; obtaining information representing one or more frequency bands that correspond to likely radio signals in the communications data as an output of the first machine learning processing the communications data; providing at least a portion of the communications data corresponding to the one of the one or more frequency bands to a second machine learning model that is trained to detect one or more features of radio signals; and obtaining a signal classification as an output of the second machine learning model generated by processing the portion of the communications data provided to the machine learning model.

20 Claims, 8 Drawing Sheets

400

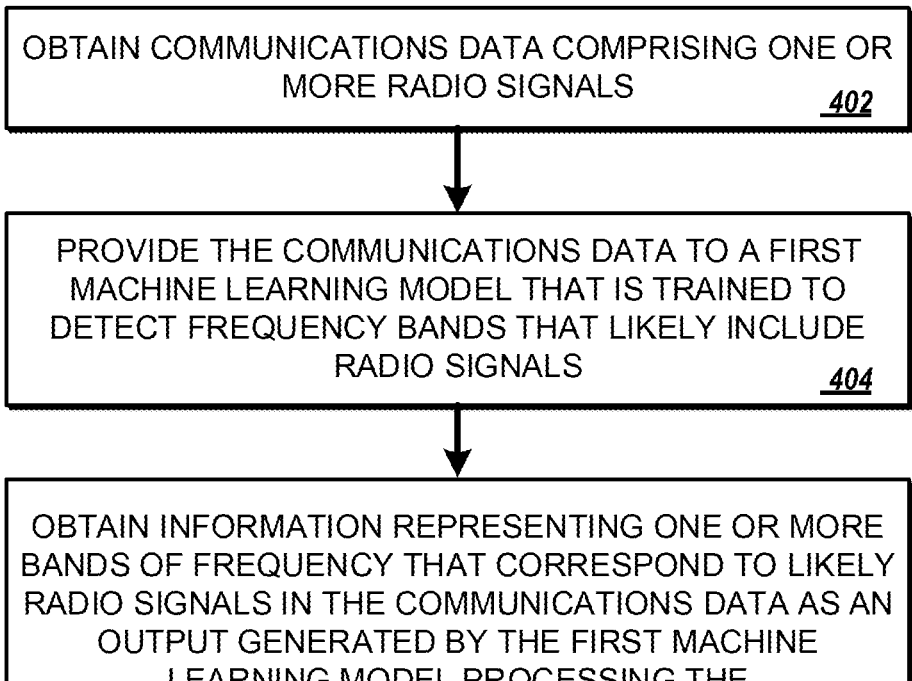

OBTAIN COMMUNICATIONS DATA COMPRISING ONE OR MORE RADIO SIGNALS
402

PROVIDE THE COMMUNICATIONS DATA TO A FIRST MACHINE LEARNING MODEL THAT IS TRAINED TO DETECT FREQUENCY BANDS THAT LIKELY INCLUDE RADIO SIGNALS
404

OBTAIN INFORMATION REPRESENTING ONE OR MORE BANDS OF FREQUENCY THAT CORRESPOND TO LIKELY RADIO SIGNALS IN THE COMMUNICATIONS DATA AS AN OUTPUT GENERATED BY THE FIRST MACHINE LEARNING MODEL PROCESSING THE COMMUNICATIONS DATA
406

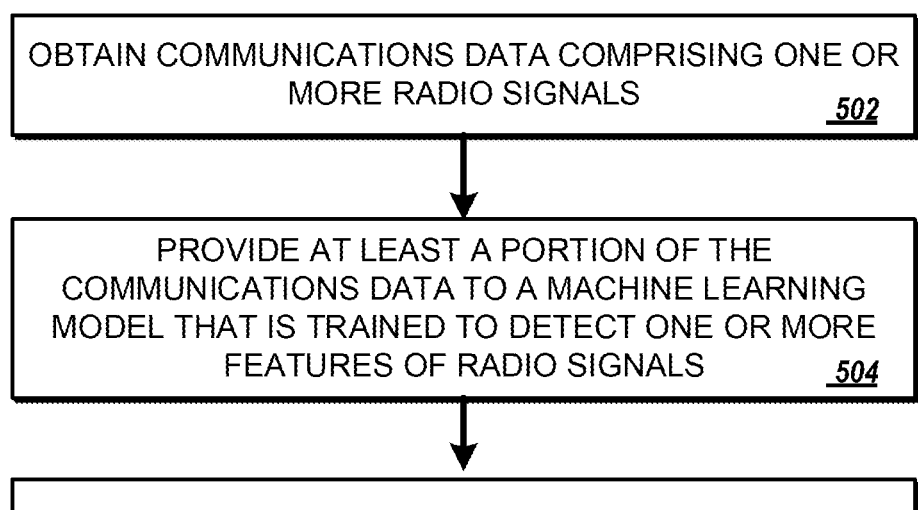

OBTAIN COMMUNICATIONS DATA COMPRISING ONE OR MORE RADIO SIGNALS          _502_

PROVIDE AT LEAST A PORTION OF THE COMMUNICATIONS DATA TO A MACHINE LEARNING MODEL THAT IS TRAINED TO DETECT ONE OR MORE FEATURES OF RADIO SIGNALS          _504_

OBTAIN OUTPUT OF THE MACHINE LEARNING MODEL, WHEREIN THE OUTPUT IS GENERATED BY THE MACHINE LEARNING MODEL BASED ON PROCESSING THE PORTION OF THE COMMUNICATIONS DATA PROVIDED TO THE MACHINE LEARNING MODEL          _506_

FIG. 5

SIGNAL DETECTION USING MACHINE LEARNING MODELS

CROSS-REFERENCE TO RELATED APPLICATION

This application claims the benefit of U.S. Provisional Application No. 63/312,991, filed Feb. 23, 2022, the contents of which are incorporated by reference herein.

FIELD

This specification generally relates to communications systems that use machine learning and includes processing of communications signals using one or more machine learning models.

BACKGROUND

Communications systems involve transmitting and receiving various types of communication media, e.g., over the air, through fiber optic cables or metallic cables, under water, or through outer space. In some cases, communications channels use radio frequency (RF) waveforms to transmit information, in which the information is modulated onto one or more carrier waveforms operating at RF frequencies. In other cases, RF waveforms are themselves information, such as outputs of sensors or probes. Information that is carried in RF waveforms, or other communication channels, is typically processed, stored, and/or transported through other forms of communication, such as through local or wide-area networks.

SUMMARY

In some implementations, techniques described in this document include systems and methods for identifying sub-bands or sub-sets of a sampled received RF signal and determining a set of parameters or properties of the RF signals that may be used for signal processing to process and/or extract secondary signals, which are in turn processed through a second machine learning model to classify characteristics of the secondary signals. The plurality of secondary signals in the sampled RF signal can overlap in frequency, time and/or bandwidth; the disclosed techniques enable isolating individual signals from the sample and determining characteristics of the isolated signals. These characteristics include, for example, signal type, transmitting device, type of transmitting device, model of transmitting radio, air interface standard or name, modulation type, type of electromagnetic interference (EMI), type of radar or jammer, type of traffic or emitter behavior, direction(s) or power of emitter(s), among others.

One innovative aspect of the subject matter described in this specification is embodied in a method that includes obtaining communications data comprising one or more radio signals; providing the communications data to a first machine learning model that is trained to detect one or more frequency bands that likely include radio signals; obtaining, as an output of the first machine learning model, information representing one or more frequency bands that correspond to likely radio signals in the communications data, wherein the information representing the one or more frequency bands is generated by the first machine learning model by processing the communications data; providing at least a portion of the communications data corresponding to the obtained one or more frequency bands to a second machine learning model that is trained to detect one or more features of radio signals; and obtaining, as an output of the second machine learning model, a signal classification corresponding to the obtained one or more frequency bands, wherein the signal classification is generated by the second machine learning model based on processing the portion of the communications data provided to the second machine learning model.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, generating the information representing the one or more frequency bands by the first machine learning model by processing the communications data includes processing, by the first machine learning model, the communications data using one or more regression heads.

In some implementations, processing, by the first machine learning model, the communications data using the one or more regression heads includes processing, by the first machine learning model, the communications data using one or more fully connected layers in the one or more regression heads to predict a likelihood that a particular frequency band likely include radio signals.

In some implementations, training the one or more regression heads includes comparing a predicted set of frequency bands that likely include radio signals to a known set of frequency bands that include radio signals using a set matching algorithm.

In some implementations, training the one or more regression heads includes minimizing a difference between the predicted set of frequency bands that likely include radio signals to the known set of frequency bands that include radio signals.

In some implementations, actions include determining, by the first machine learning model using one or more classifier heads, a class of each radio signal of the radio signals.

In some implementations, actions include providing features associated with the one or more radio signals to the second machine learning model with the portion of the communications data, wherein the features include one or more of a center frequency, bandwidth, confidence value, or signal strength.

In some implementations, obtaining the communications data comprising the one or more radio signals includes obtaining data representing in-phase and quadrature signals demodulated from a received radio signal of the one or more radio signals.

In some implementations, actions include generating the portion of the communications data by performing one or more of the following signal processing on the communications data: normalization, scaling, filtering, tuning, decimation, resampling, adjustment, transformation, channelization, or feature extraction.

In some implementations, generating the signal classification by the second machine learning model by processing at least the portion of the communications data includes processing, by the second machine learning model, the portion of the communications data using one or more classifier heads to determine a signal classification of each radio signal in the one or more radio signals.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 4 is a flow diagram illustrating an example of a process for detecting frequency bands that correspond to likely radio signals using machine learning models.

FIG. 5 is a flow diagram illustrating an example of a process for detecting one or more properties of a radio signal using machine learning models.

Like reference numbers and designations in the various drawings indicate like elements.

DETAILED DESCRIPTION

Figure 1:
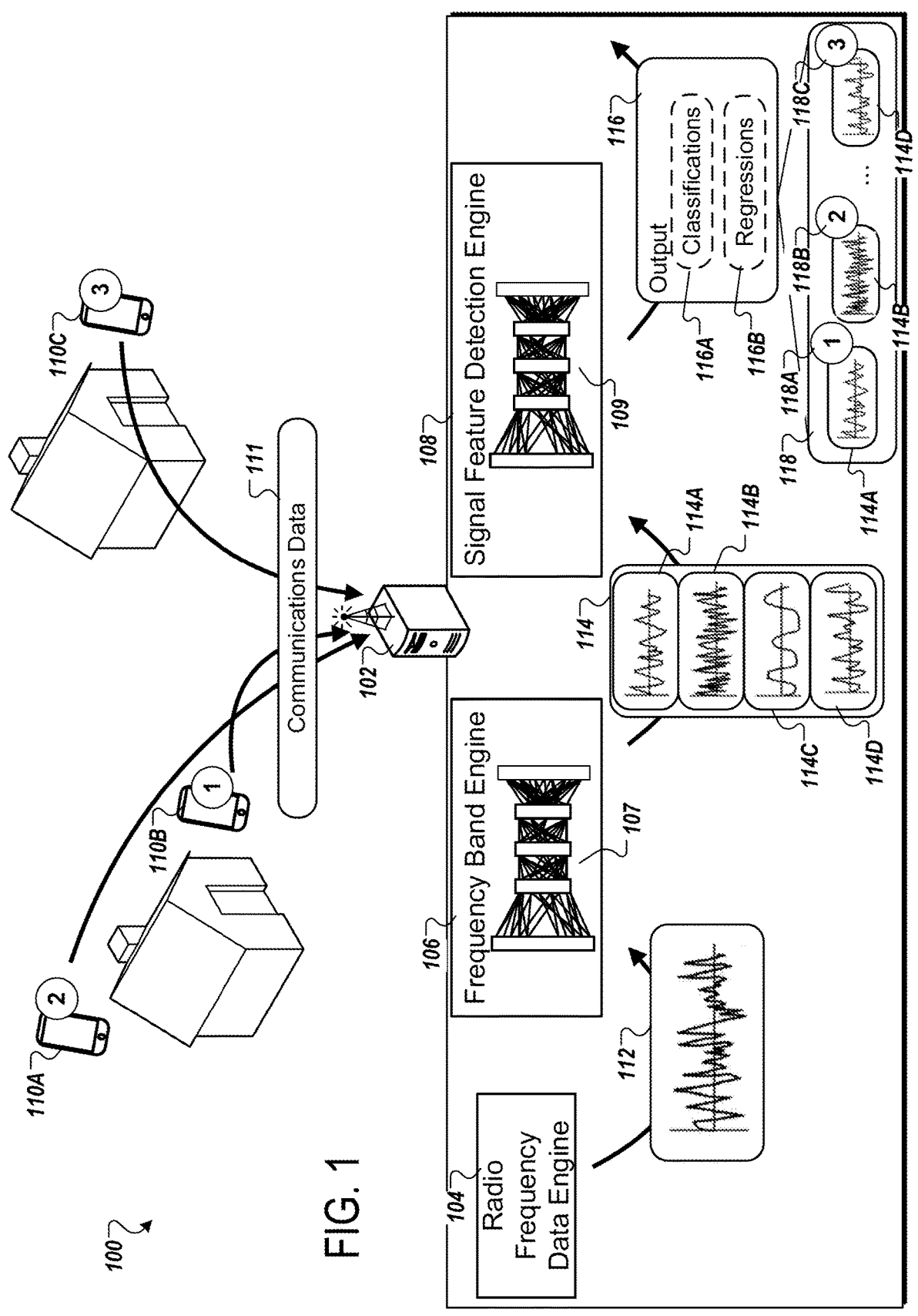
FIG. 1 is a diagram showing an example of a system for detecting signals using machine learning models.

The electromagnetic spectrum includes signals or spectral phenomena at different frequencies, times, and bandwidths, which can operate independently or can be superimposed. The characteristics of these signals over time—e.g., on/off, power profile, phase profile, or transmit mode, among others—can vary between signal types. These characteristics over time, which can be referred to as time transients or independent emissions, are useful for spectrum sensing and monitoring for a variety of applications.

Example signals can include "always on" signals such as broadcast radio, where signals may be constantly present, time delay duplex (TDD) based signals such as Global System for Mobile Communications (GSM) which can have split time slots which may be empty or occupied in both downlink or uplink direction, random access channels such as Wi-Fi or Bluetooth which can burst aperiodically over time and frequency allocation, radars which can occupy various time and frequency offsets, EMI which can often sprawl across random time-frequency patterns, among others. A system for signal detection can generalize to be able to detect and localize the signals in time and frequency across one or more of these various types of temporal access patterns as well as others.

To monitor these transients or independent emissions, the signals can be isolated, for instance in frequency and bandwidth or spatial dimension, to avoid capturing transients from adjacent signals or phenomena. This document describes techniques to receive and process radio signals through one or more machine learning networks that are configured to detect and determine properties or features of component signals. One such disclosed technique may be performed in two phases including signal detection and separation in a first phase (phase 1), and signal property or feature extraction in the second phase (phase 2). In some implementations, a first machine learning model and a second machine learning model are respectively used in the two phases. In some implementations, the phases are fused together into one larger network process, and one or more machine learning networks are applied to the larger network process.

The bandwidths of spectral regions of interest can vary on the order of magnitudes depending on a content of a sub-band (for example, Very High Frequency (VHF) radios such as push to talk (PTT) can use channels on the order of 10 kHz, while common 5G emitters can use channels on the order of 100 MHz, or potentially even GHz in higher bands such as (Frequency Range 2) FR2. Bands such as High Frequency (HF) can use smaller—e.g., bandwidths under 1 kHz—so the order of magnitude between different types of emitters can vary); the electromagnetic RF communications channel can introduce deep fades of signals within the bandwidth; and the sub-bands can occur at random time-offsets within a sampled bandwidth. Systems disclosed herein can use a machine-learned model—e.g., in a first phase—to capture characteristics of spectral regions of interest—such as those specified by a user during training—to identify whole sub-bands of interest.

Time duration and spacing between emissions or time features can change and can vary on the order of magnitudes—e.g., some may last only nanoseconds or microseconds while others last milliseconds or seconds or longer. Systems disclosed can use a machine-learned model—e.g., in a second phase—to relate short-time duration events over a longer time window—e.g., 100 microseconds over a 2 millisecond window—so that short events can be captured while longer and slower events can use context across time to be accurately modeled.

Two or more phases can be used independently or jointly, e.g., to identify spectral regions of interest or time events within a sampled spectrum. Additionally or alternatively, two or more phases can be used jointly, e.g., to identify time events or properties of events within one or many spectral regions.

The techniques disclosed in this document can identify combinations of other types of regions, including spatial regions of interest when multiple apertures—such as radio antennas configured to transmit or receive signals or full bands of signals—are used. Spatial regions can be identified either as part of a sub-band region of interest or using the time transients when given a spectral region of interest.

FIG. 1 is a diagram showing an example of a communications system 100 for detecting radio signals using machine learning models. The system 100 includes a processing unit 102 that operates a radio frequency (RF) data engine 104, a frequency band engine 106, and a signal feature detection engine 108. The processing unit 102 can be realized using one or more computers communicably connected to one another—e.g., through wired or wireless connections. In general, FIG. 1 shows the system 100 obtaining communications data 111—e.g., RF signals or transmissions—from devices 110A, 110B and 110C, and determining properties of signals generated by the devices 110A-C using one or more processing elements—e.g., the radio frequency data engine 104, the frequency band engine 106, and the signal feature detection engine 108. In some implementations, one or more signals of the communications data 111 is obtained from sources other than the devices 110A, 110B, and 110C. For example, one or more signals of the communications data 111 can be synthetically generated, e.g., by the processing unit 102. As shown, the communications data 111 obtained by the processing unit 102 is a combination of individual RF signal transmissions or emissions by one or more of the devices 110A-C. As described below, the processing unit 102 is configured to extract and classify individual signals or emissions present in the communications data 111, using one or more machine learning models realized by the constituent components of the processing unit.

Obtaining Communications Data

As noted above and shown in FIG. 1, in some cases, the processing unit 102 obtains the communications data 111 from the devices 110A-C. The processing unit 102 can be coupled to one or more antennas configured to sample the electromagnetic spectrum and receive RF data, including the communications data 111. The communications data 111 can include one or more radio signals. However, radio signals in the communications data, due to interference or signal fading, among other effects, can be obfuscated and may not be recoverable or detectable without further processing.

Transforming Communications Data

The processing unit 102 provides the communications data 111 to the radio frequency data engine 104. The radio frequency data engine 104 processes the communications data 111 to generate transformed data 112 as input for the frequency band engine 106. In some implementations, the transformed data 112 includes a wideband signal that represents a combination of one or more signals—e.g., separated signals 114.

In some implementations, the transformed data 112 includes a time domain sampled signal. The time domain sampled signal can have one or more regions specified by pairs of center frequency and bandwidth. In some implementations, the radio frequency data engine 104 performs one or more transforms. For example, the radio frequency data engine 104 can perform operations corresponding to a Fourier transform, a discrete Fourier transform, a welsh spectrum estimate, a spectrogram estimate, a short time Fourier transform (STFT), a set of OFDM time-frequency bins, a wavelet transform, a set of pre-processing routines, normalization, or feature extraction, among others. In the case where the radio frequency data engine 104 performs a Fourier transform, the radio frequency data engine 104 can transform one or more time domain sampled signals into a frequency domain input for the frequency band engine 106.

In some implementations, the radio frequency data engine 104 performs one or more operations including one or more expert-transformations. For example, the radio frequency data engine 104 can perform one or more operations to estimate power spectral density (PSD). For example, the one or more operations can include performing Welch's method for spectral density estimation. The transformed data 112 generated by the radio frequency data engine 104 can be used as input for a machine learning model—e.g., a first machine learning model 107 operated by the frequency band engine 106. In some implementations, operations performed by the radio frequency data engine 104 include one or more of filtering, shifting frequency, down sampling, or combining samples—e.g., from different apertures with an amplitude, phase, or time delay according to an inferred or implicit aperture factor, or from an analogous non-linear learned combining scheme which similarly combines each aperture using a parametric or machine learning model. An aperture factor can include an array factor as a function of one or more positions of antennas in an array and weights (e.g., a complex weight $w_i$) used to generate a phased array output of the array. In general, an antenna array's performance can be optimized to achieve desirable properties by adjusting one or more of the weights—e.g., steered in a direction of maximum radiation or reception.

Processing Transformed Communications Data

The first machine learning model 107 of the frequency band engine 106 processes the transformed data 112 to determine one or more radio signals that may be present in the wide band signal represented by transformed data 112. In some implementations, the first machine learning model 107 performs a set of regressions using a series of regression heads at frequency or timing offsets—e.g., within an input signal. Different regression heads can provide different output indicating one or more of (i) signal-ness or whether or not a signal is likely detected, (ii) bandwidth for one or more frequencies, or (iii) frequency deviation. The regression heads can provide the output for one or more ranges of frequency within a frequency spectrum identified by the processing unit 102 for signal detection. In some implementations, the output of the frequency band engine 106 (e.g., generated using the first machine learning model 107) includes distinct signals separated using a form of channelization. For example, the first machine learning model 107 can perform on or more channelization operations to separate the wideband signal corresponding to the transformed data 112 into the separated signals 114.

As described previously, in some implementations, the processing unit 102 is coupled to two or more antennas. The transformed data 112 can include data indicating signals received at the two or more antennas—e.g., with time-delay, phase delay, or other offset corresponding to relative or nearby antenna or receive apertures. The frequency band engine 106 can perform one or more regression techniques to combine both samples in a way that maximizes signal-to-noise ratio of a given spectral region of interest or identify an angle-of-arrival relative to antenna geometry.

In some implementations, the first machine learning model 107 includes a series of regression heads. For example, a series of regression heads of the first machine learning model 107 can be used—e.g., by the frequency band engine 106—to predict values corresponding to input signals included in the communications data 111 and represented in the transformed data 112. Regression heads of the first machine learning model 107 can include heads for signal-ness, bandwidth, frequency deviation, one or more angle of arrival, or aperture factors (e.g., an estimate or learned transform for an array which may be derived over a period of time). Output of the regression heads can help to provide parametric improvements to combining and recovery of a signal over spatial or element dimensions, as well as over time, and dilation or dispersion dimension in some cases.

In some implementations, the frequency band engine 106 generates one or more frequency region proposals. For example, the frequency band engine 106 can generate output that includes frequency region proposals with a vector output per parameter—e.g., center, bandwidth, frequency deviation, one or more angles of arrival, or aperture factor. In some cases, the output can include a class estimate for a type of signal or signal class. This estimate can be performed by a second network, such as the second machine learning model 109. The frequency band engine 106 can use a bottleneck method such as a UNet. Using a bottleneck method can help to retain frequency locality of input and output regions through bypass and locality mechanisms. A variety of outputs can be regressed by the frequency band engine 106. A preprocessing or transformation stage can be used and preserved throughout a bottleneck method, such as U-Net, to preserve a signal-dimension in frequency more robustly. Other architectures can be used, for instance, W-Nets, SE-Nets, UNet++, Transformer networks such as LeViT, SWIN, VIT, XCIT, or MobileViT, residual networks, patch architectures such as convolutional mixer models, among others.

In some implementations, the frequency band engine 106 obtains raw time-domain samples of the communications data 111. The frequency band engine 106 can provide the raw time-domain samples to the first machine learning model 107. The first machine learning model 107 can be configured to output one or more parameters indicating frequency regions of interest, e.g., including the location, bandwidth, frequency deviation, angle(s) of arrival, or aperture factor. In some implementations, the frequency band engine 106 includes an azimuthal beam former.

In some implementations, the first machine learning model 107 includes one or more network layers. For example, the one or more network layers can perform signal separation along a signal dimension—e.g., time, frequency, among others—determined by one or more output regression values and how they are labeled along a given dimension—e.g., time, frequency, bandwidth, aperture, or other input dimension. For example, multiple regression heads of the first machine learning model 107 can predict a range of features—such as a binary value indicating whether or not a signal is present—for corresponding time or frequency regions within input—e.g., the transformed data 112. Features can be either separable using expert pre-processing transforms or through learned neural network separation techniques. The first machine learning model 107 can use learned neural network separation techniques. The first machine learning model 107 can learn targets and a mapping through one or more non-linear transformations within the first machine learning model 107 from input—e.g., the transformed data 112—to target information—e.g., the separated signals 114.

In some implementations, the first machine learning model 107 generates a set of center frequency, bandwidth or aperture values corresponding to distinct signals present in the transformed data 112. The frequency band engine 106 can obtain the values and provide the values as parameters to one or more digital signal processing routines. In some implementations, the frequency band engine 106, or processing devices communicably connected to the frequency band engine 106, perform operations of the one or more digital signal processing routines. For example, the frequency band engine 106, or processing devices communicably connected to the frequency band engine 106, can extract and isolate individual signals from the transformed data 112 to generate the separated signals 114 that include distinct and separated signals (e.g., signals 114A, 114B, 114C and 114D) that were combined in the prior transformed data 112. These signals can be separated in time, frequency, or spatial processing, or within various other basis functions in which signals may be separated or detangled. Extracted or separated signals from the frequency band engine 106 can include residuals or mixing of artifacts.

Extraction, isolation, or separation of signals can be performed by the first machine learning model 107. Extraction, isolation, or separation of signals can be performed by one or more digital signal processing routines, e.g., performed by the frequency band engine 106. In some implementations, separation is performed in one or more digital signal processing routines. For example, a FFT, polyphase channelizer, or synthesis bank can separate signals based on parameters estimated by the first machine learning model 107—e.g., one or more of center frequency, bandwidth, or timing, among others.

In some cases, the frequency band engine 106 performs one or more of tuning, filtering, or resampling. For example, the frequency band engine 106 can perform one or more of tuning, filtering, or resampling to help isolate one or more signals—e.g., a first signal 114A from a second signal 114B. The frequency band engine 106 can provide the generated separated signals 114 to the signal feature detection engine 108.

Detecting One or More Features

In some implementations, the processing unit 102 operates the signal feature detection engine 108. The signal feature detection engine 108 obtains the separated signals 114 from the frequency band engine 106 and generates output 116. In some implementations, the signal feature detection engine 108 provides one or more of the separated signals 114 to a second machine learning model 109, which processes the separated signals 114 to generate the output 116. The separated signals 114 can include one or more sub-bands that are processed by the second machine learning model 109.

In some implementations, the second machine learning model 109 processes one or more transients in the separated signals 114. For example, the second machine learning model 109 can include one or more classification or regression heads to process one or more transients in the separated signals 114 and generate one or more of classification output 116A or regression output 116B. Classification can include predicting different signal types over time. The second machine learning model 109 can detect classifications for a given signal of the separated signal 114 over time windows of limited duration. In some cases, the time windows can be very short. For example, communications or radar signals can have short bursts or pulses lasting microseconds or less in length. The second machine learning model 109 can obtain a context of time windows neighboring a first time window in order to capture transient events on different time scales such as very bursty signals or always-on signal. Some always on signals such as broadcast signals, or point to point radios can remain on continually for seconds, minutes, or days without interruption. In some implementations, a classification using a full observation length (e.g., one or more milliseconds) is used to identify one or more signals. In some implementations, the signal feature detection engine 108 detects tens, hundreds, or thousands of separate classifications within a single observation. For example, a single observation can include 20 microsecond hops or bursts of data that, in some cases, may be interleaved of different types.

In some implementations, the second machine learning model 109 determines a particular signal class for each of the separated signals 114. For example, for each of the separated signals 114, the second machine learning model 109 can determine which class best describes the signal over one or more time slots. A signal class can include an intelligible name for a given signal or air interface standard such as LTE-downlink, LTE-uplink, Wi-Fi, Bluetooth, P25, General Mobile Radio (GMR), FM, CDMA2000, GSM, Advanced Television Systems Committee (ATSC), among others. A signal class (or simply class) can include a background signal type and one or more specific signal types. A background class can include a number of different signal types, for example, one or more of GMR and cellular signals mixed together. A foreground class can include a high importance signal to detect such as an unmanned system telemetry or command link, a hostile jammer, or emitter type radio, e.g., to be effectively separated from a background typically generated by specific types of devices or specific, uniquely defined, devices. Devices can include radios using a specific air interface type, made by a certain manufacture or implementation of an air interface, specific devices, such a specific phone (e.g., a device corresponding to one Media Access Control (MAC), International Mobile Equipment Identity (IMEI), serial number, learned features of transmission data-such as any number of underlying phenomenon from hardware, software, protocol contents, reference signals or structure, or other signatures of each type of emission). A specific uniquely defined device can be, for example, one of devices 110A, 110B or 110C, which is identified by the respective IMEI number or network interface MAC address. The second machine learning model 109 can determine a Boolean value for each time slot indicating whether the second machine learning model 109 detects a type of signal within the separated frequency band. Classifications can be included in the classification output 116A of the output 116.

In some implementations, the second machine learning model 109 performs one or more regression operations. The signal feature detection engine 108 can generate regression output 116B included in the output 116. The regression operations can be included in regression heads that generate output within the second machine learning model 109. For regression, the second machine learning model 109 can regress features on time windows of limited duration—e.g., from low microseconds to milliseconds but may vary depending on data rates, FFT rates, observation window sizes or other factors—to capture the feature at a short time resolution using adjacent context. This can be useful in capturing aperture factors across multiple antennas, bands and propagation environments, and types of emitters.

In some implementations, the processing unit 102 combines aperture factors across multiple channels to generate an angle-of-arrival estimate from a signal transmitter in motion (e.g., RF emissions from a mobile device). For example, the processing unit 102 can generate one or more regressed values indicating angle-of-arrival—e.g., amplitude, phase, or time difference—for one or more apertures—e.g., apertures for receiving the communications data 111 at the processing unit 102.

In some implementations, the processing unit 102 generates an angle-of-arrival estimate from a signal transmitter. For example, the processing unit 102 can generate an angle-of-arrival estimate using one or more regression heads without using any aperture or array factor explicitly. The signal transmitter can be a transmitter in motion (e.g., RF emissions from a mobile device).

The second machine learning model 109 generates output 116. In some implementations, the output 116 includes classifications 116A or regressions 116B, or both. In some implementations, the classifications 116A include predictions generated by the second machine learning model 109 indicating a series of classes of signal properties or types for a series of time-slots or windows in a given signal—e.g., the first signal 114A—after it has been processed by the second machine learning model 109 based on output from the first machine learning model 107 or the frequency band engine 106. The second machine learning model 109 can generate classifications for each of the signals 114A-114D. As described previously, these individual signals could be included in a wide-band signal represented by the transformed data 112 that was provided by the frequency band engine 106 as input to the first machine learning model 107.

In some implementations, the output 116 includes data 118 indicating the classifications for one or more signals. For example, the data 118 can include classifications 118A, 118B, and 118C, respectively, for separated signals 114A, 114B, and 114D. One or more of the classifications 118A, 118B, and 118C can indicate an identifier representing a device (e.g., one of devices 110A-110C) that generated the corresponding signal. For example, the signal 114A can be generated by the device 110B, and the classification 118A corresponding to the signal 114A can include information identifying device 110B. The information can be, for example, a unique identifier of a user of the device 110B (e.g., an application identifier associated with an application executed by the device, or log in information about the user), a unique identifier of the given device (e.g., IMEI number and/or MAC address), an angle of arrival for the corresponding radio signal transmitted by the device, a classification for the signal 114A indicating that the signal 114A is a signal transmitted by the user device 110B, or is of a signal type associated with transmissions by the user device 110B, or any suitable combination of the above classification information. The angles of arrival for one or more of the signals 114A-D provided by the output 116 can indicate at what angles transmissions from the devices 110A-C arrived at antennas connected to the processing unit 102; such angle or arrival information can be used to determine locations of the devices 110A-C.

In some implementations, the information indicating presence or types of signals, or angles of arrival of signals, or both, is used to optimize scheduling of a wireless system. For example, if the processing unit 102 detects one or more types or number of signals, or detects one or more types or number of signals from a specific range of arrival angles, the processing unit 102 can determine one or more adjustments to provisioning a communications system (e.g., the system 100) to service devices in a given area. In some implementations, the processing unit 102 provides the output 116 to another processing device to determine signals to send to downstream processes. For example, the processing unit 102 can provide the output 116 to a machine learning model trained to predict computing or processing requirements for a predicted usage of the communications system, based on the signal classifications provided by the output 116. The output 116 can indicate, for example, an increase or decrease in usage of particular resources for processing wireless communications in the communications system 100, based on the extraction and classification of radio signals 114A-114D, as described above.

In some implementations, the processing unit 102 provides the output 116 to a user device. For example, the processing unit 102 can convey data corresponding to the output 116 to one or more of the devices 110A-C, or another device in the system 100. The processing unit 102 can configure the data for display on the receiving device. In some implementations, the data generated by the processing unit 102 is configured to display one or more classifications for signals detected within a given area—e.g., by one or more apertures communicably connected to the processing unit 102.

In some implementations, the processing unit 102 provide automated actions using data of the output 116. For example, in response to detecting presence of a particular signal or type of signal, the processing unit 102 can generate an alert to a user device or control one or more automated systems. In some cases, automated systems can control security mechanisms, e.g., to protect one or more systems from adversarial devices or other unknown devices. For example, the processing unit 102 may detect, using the classifications in the output 116, that a particular unauthorized device, such as a hacking device, is in a particular area of the system 100. In response to detecting the signal of the particular device, the processing unit 102 can send a signal to an automated system for jamming signals or robot deployment. Additionally or alternatively, the processing unit 102 can trigger an alert when a device transmitting signals of a particular type or a particular known device is detected. In some implementations, the processing unit 102 flags anomalous signals for further processing or review. In this manner, using operations performed by the processing unit 102, the system 100 can provide spectral awareness for a given sensing region—e.g., a region that is able to be sensed using radio frequency from one or more sensors communicably connected to the processing unit 102.

The system 100 can improve on traditional signal detection approaches by reducing noise in detected signals through the multi-stage machine learning processing approach compared to traditional approaches. Instead of processing based on energy detection, spectrograms, or preamble detection, the system 100 can use a trained set of machine learning models to first identify particular signals and then identify properties of those signals. This approach can improve robustness by reducing likelihoods of false negative signal detections—e.g., particular signal types that have not been included in a training set. Because the first machine learning model 107 is trained exclusively to detect signals in some implementations, it can be less biased in detecting only some types of signals over another. Instead, it can detect all signals included in the communications data 111. The second machine learning model 109 can be trained to identify specific signals of interest but can also learn to identify new signals that are detected by the first machine learning model 107. In some cases, the second machine learning model 109 can be trained online using user feedback specifying a type for a signal that the second machine learning model 109 did not classify or classified as unknown or a background signal. The processing unit 102 can use the user feedback as ground truth data for adjustment of one or more weights or parameters inside the second machine learning model 109.

In some implementations, the frequency band engine 106 includes the first machine learning model 107 and the signal feature detection engine 108 includes the second machine learning model 109. For example, the processing unit 102 or one or more other computers can train the first machine learning model 107 to detect one or more frequency bands from a sampled signal, e.g., included in transformed data 112. The processing unit 102 or one or more other computers can train the second machine learning model 109 to determine one or more properties of signals within frequency bands detected by the first machine learning model 107.

Figure 2:
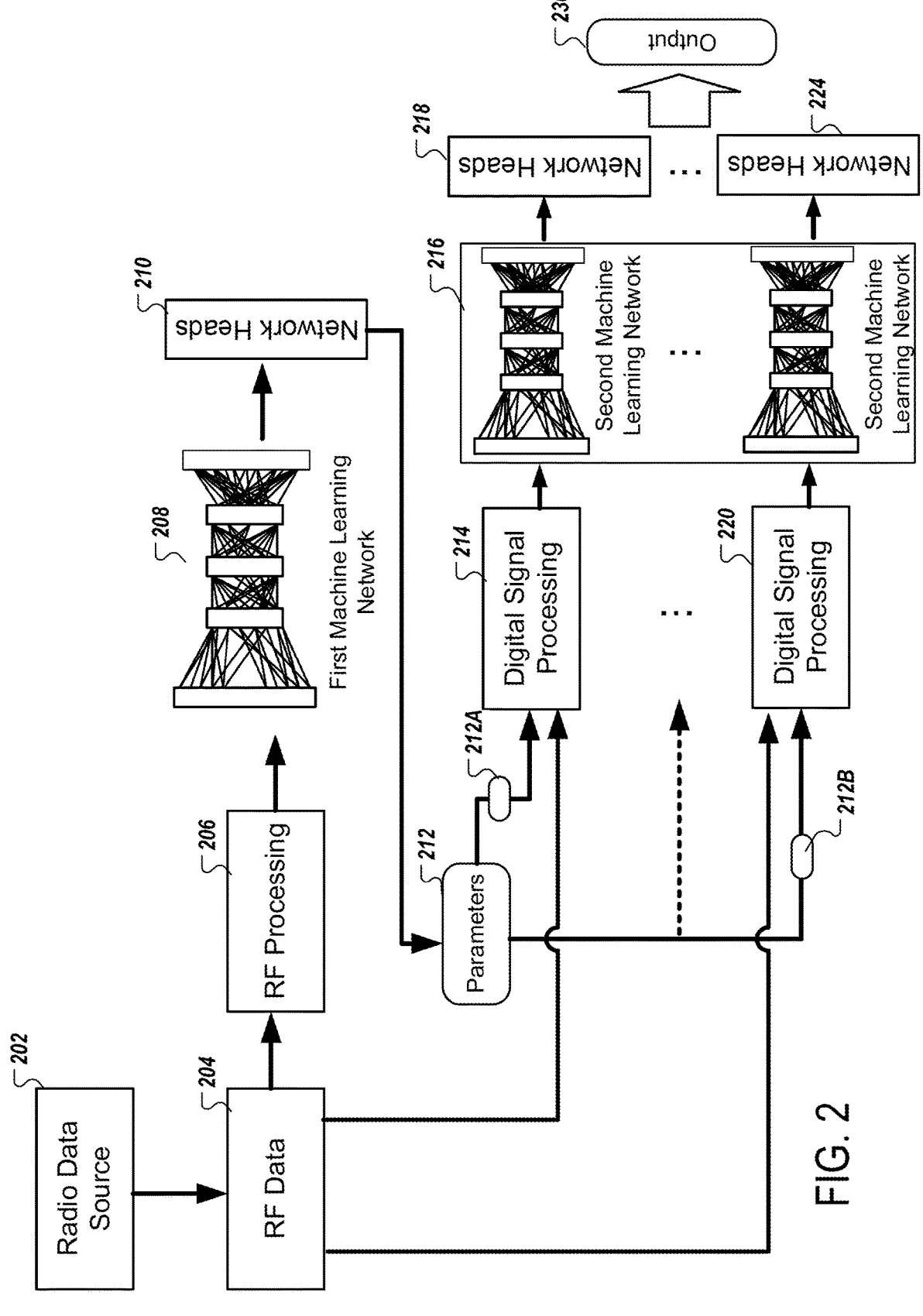
FIG. 2 is a diagram showing an example flowchart for detecting signals using machine learning models.

FIG. 2 is a diagram showing an example flowchart for detecting signals using one or more machine learning models. As shown, the one or more machine learning models in FIG. 2 include a first machine learning model 208 and a second machine learning model 216. The flowchart demonstrates a process that can be performed by one or more systems, such as the system 100 of FIG. 1. In some implementations, the processing unit 102 performs one or more operations described in the flowchart of FIG. 2. In some implementations, the first machine learning model 208 and the second machine learning model 216 of FIG. 2 are respectively same as, or similar to, the first machine learning model 107 and the second machine learning model 109 described in reference to FIG. 1, and can perform similar or the same operations.

In some implementations, the first machine learning model 208 takes in one or more RF data signals 204 from a radio data source 202 through various processing stages 206—e.g., pre-processing, transforms, or feature extractors—and produces a set of outputs through network heads 210—e.g., regression or classification heads. In some implementations, output from the network heads 210 is provided—e.g., by an operating device such as the processing unit 102—into an output processing module, which may feed information to a digital signal processing (DSP) routine.

In some implementations, the radio data source 202 includes a hardware radio device, such as a software-defined radio (SDR) along with an antenna, filters, amplifiers, or an analog to digital converter. The radio data source 202 can be similar or the same as the devices 110A-C. The radio data source 202 can generate one or more sets of RF data 204. The radio data source 202 can include a radio, a hardware sampling device, a file, storage, a network protocol, or another source. The radio data source 202 can transfer RF samples to memory on a computing device as the RF data 204 for processing. The RF data 204 can include digital representations of analog radio signals. The RF data 204 can include a time series in complex baseband, in-phase and quadrature (I/Q) format. The RF data 204 can include input data from a radio spectrum. The RF data 204 can include sampled data from an acoustic spectrum or optical spectrum that is sampled from one or more types of hardware sampling devices. The one or more types of hardware sampling devices can digitize various types of signals in the natural world or otherwise.

The RF data 204 is provided as input to the first machine learning model 208. The first machine learning model 208 can be configured or trained to detect signals in the RF data 204. The RF data 204 can include raw RF data or processed RF data—e.g., processed by the RF processing 206. For example, the RF data 204 can be provided by an operating device to one or more receive transforms such as fast Fourier transform (FFT), wavelet transform (WT), filter banks, discrete Fourier transforms (DFT), spectrogram computations, short-time spectrogram computations; preprocessing routines such as normalization, IQ imbalance correction, DC removal, other DSP routines, or feature extractors such as various mathematical transforms of the aforementioned operations. The RF processing 206 can include one or more of these operations. A processed or unprocessed version of the RF data 204 can be provided—e.g., by an operating device such as the processing unit 102—to the first machine learning model 208.

In some implementations, the first machine learning model 208 includes a series of multiply or accumulate operations. For example, the first machine learning model 208 can include a set of parameters and combine those parameters with inputs in order to form a set of outputs. The first machine learning model 208 can include a set of intermediate layer activation values. For example, the first machine learning model 208 can include a deep convolutional or residual neural network with a series of nonlinearities such as rectified linear units (RELU), Gaussian Error Linear Unit (GELU), Parametric RELUs (PRELU), Scaled Exponential Linear Units (SELU), sigmoid, or a number of other such nonlinearities.

In some implementations, the first machine learning model 208 includes architectures such as bottleneck architectures (e.g., U-Net), or may use units similar to Squeeze-Excite or Convolutional Mixer blocks (or other similar architectures disclosed in this document, e.g., architectures of the frequency band engine 106) in order to operate efficiently. The first machine learning model 208 can have a series of regression heads—e.g., as a part of the network heads 210—that operate on values within the first machine learning model 208 to perform regression or prediction of values corresponding to phenomena in the RF data 204. A series of regression heads in the network heads 210 can be used that corresponds to a data-dimension, for example, offsets in time, frequency, spatial dimensions such as azimuth or elevation, or another such dimension in the data or in order to estimate any other properties of an emitted signal.

In some implementations, the network heads 210 generating output of the first machine learning model 208 can include one or more regression heads. The regression heads can perform regression at a variety of frequency offsets within a signal. Each head can perform a set of regression tasks corresponding to certain frequency regions or other subset of dimensions within the RF data 204 or its transforms—e.g., processed output of the RF processing 206. Regression can occur over a number of possible outputs. For example, the network heads 210 can perform regression of the frequency offset from a fixed frequency to the frequency of a signal within the RF data 204 (e.g., one or more of the separated signals 114 relative frequency offset), a bandwidth, sample rate or a related value of a signal that is within a range compared to a frequency of a given regression head or a relative bandwidth (e.g., scaled linearly or non-linearly), a value corresponding to a likelihood of a signal being present at or near a frequency offset, other properties corresponding to a signal such as direction or other data-dimension corresponding to properties of a signal, or other values corresponding to channel or signal properties or relative measures between the two of them.

In some implementations, output of the network heads 210 is provided to an output processing module. The output processing module can receive a number of values from the output of the network heads 210—e.g., regression values from regression heads—and perform various operations such as clustering, de-duplication, averaging, combining, filtering, among other operations, to establish a more stable or accurate set of values describing a set of signals, emissions or phenomena in the original RF signal, which might be described in some form by regression bins. A more stable or accurate set of values can include a range of properties, such as center frequency, bandwidth, confidence in a class or emission type, signal strength, among others, that can be estimated by one or more of the first machine learning model 208 or second machine learning model 216 with potential error or variance. For example, there may be an error distribution or variance around an estimate for a single-shot estimate.

By combining estimates across multiple independent estimates, variance can be reduced thus increasing a confidence value in the estimates. Combining estimates can also establish longer signal on-times than could have been observed within a single window. This combining can be performed using a number of techniques, such as clustering, combining, averaging, histogram combining, further processing by sequence-model style neural networks, or other machine learning models. Such a network and regression bins can be trained using a number of techniques, such as: (i) forming target regression values from a set of supervised input values such as SigMF files, and (ii) by adding in a series of perturbations of augmentations to them in some cases, while (iii) computing a set of distance metrics used to minimize loss by adjusting weights of the first machine learning model 208.

An output processing module (not shown) that receives output from the network heads 210 can produce a set of estimates, for example a set of estimated signals with a set of parameters 212 to describe the signals. The parameters 212 can include time, frequency, or spatial offsets, or any suitable combination of these. The estimated signals corresponding to the parameters 212 can be provided to a set of digital signal processing modules—e.g., digital signal processing modules 214 and/or 220—for subsequent processing, or to other output modules, storage, or network or protocol outputs. As shown, the parameters 212 can include groups or sets of parameters 212A and 212B, among others. The parameters 212A can describe a first set of signals, or ranges of frequency and/or time to be processed and detected by the second machine learning model 216. The parameters 212B can describe a second set of signals, or ranges of frequency and/or time to be processed and detected by the second machine learning model 216. For example, the parameters 212A can describe the first signal 114A and the parameters 212B can describe the second signal 114B.

The digital signal processing modules 214 and 220 can be the same or different. The digital signal processing modules 214 and 220 apply a set of digital signal processing (DSP) routines to the provided estimated signals corresponding to the parameters. The DSP routines include one or more of pre-processing, normalization, scaling, filtering, tuning, decimation, resampling, adjustment, transformation, channelization, feature extraction, or a number of other mathematical operations that takes a set of input parameters or values to help inform or parameterize sets of operations.

In some implementations, the parameters 212 allow the digital signal processing modules 214 and 220 to extract, tune, resample, time-gate, or isolate a single signal from a mixture of signals in the original RF data 204 (which can include a mixture of many phenomena or signals)—e.g., the transformed data 112 of FIG. 1. The digital signal processing modules 214 and 220 can obtain a set of frequency or bandwidth values included in the parameters 212 and use the set of frequency or bandwidth values to extract, tune, resample, time-gate, or isolate a single signal from a mixture of signals in the original RF data 204. Specific DSP routines or ways of applying DSP routines can change depending on the instance of the digital signal processing. Processing in digital signal processing module 214 can be different from processing in digital signal processing module 220. For example, certain types of signals or detections can be extracted or pre-processed in different ways, re-assembled depending on various bandwidths or spatial extraction modes, or may be normalized differently by sub-bands or other properties. Output from the digital signal processing 214 and 220 is provided to an instance of the second machine learning model 216.

The second machine learning model 216 obtains one or more portions of the RF data 204 indicated by a set of parameters 212 that represent various aspects of the RF data 204. The one or more portions of the RF data 204 can be generated by digital signal processing (e.g., 214 or 220) using generated parameters 212. FIG. 2 illustrates multiple instances of the second machine learning model 216 using multiple instances of digital signal processing 214 and 220. The second machine learning model 216 can include network heads 218 and 224, such as classifier or regression heads that generate output indicating one or more features of an RF signal, emission, or portion of the original RF data 204.

In some implementations, the second machine learning model 216 includes one or more neural networks. The second machine learning model 216 can process data representing one or more signals to obtain a new representation. The network heads 218 or 224 can be used to generate output—e.g., the output 116 described in reference to FIG. 1—based on the new representation generated by one or more layers of an instance of the second machine learning model 216. In some implementations, the network heads 218 or 224 include one or more classifier heads. In some implementations, the network heads 218 or 224 include one or more regression heads.

In some cases, a classifier head can include a softmax, a series of other outputs, or other types of processes to determine a possible class or label for a signal. The class or label can indicate a class or label that for a given signal described by a portion of the parameters 212—e.g., the parameters 212A or the parameters 212B. For example, the network heads 218 can include a classifier head that generates a portion of the output 230 indicating a signal protocol label, such as LTE, 2G/GSM, 3G/CDMA, 5G, Wi-Fi, Bluetooth, Radar, Lota, or other suitable protocol or technology, or may refer to a modulation such as QPSK, 8PSK, 16QAM, 64QAM, OFDM, or other suitable modulation technology. The label can represent a feature of a given signal processed by the second machine learning model 216 before the network heads 218.

The second machine learning model 216 can classify signals using a number of different labels. These labels can represent features of the corresponding signals. The labels can be used to refine a representation of a signal. The signal—such as the first signal 114A of FIG. 1—can have been further isolated, channelized, or refined through one or more parameterized signal processing routines, e.g., performed by either the signal processing 214 or 220.

In some implementations, labels generated for signals by the second machine learning model 216 represent device or transmitter based features. For example, labels can represent different devices, device manufacturers, device models, device locations, devices applications, traffic or user behaviors, or a wide range of other activities or properties related to devices or device traffic or behavior. Classification or prediction outputs from network heads 218 or 224, such as classifier heads, can be passed as the output 230 to other network or application protocols. In some cases, the output 230 can be converted into JSON, or combined with other information such as a portion of the parameters 212 that were used to extract or channelize a given signal. Combined information can be stored as output information in the various forms, such as JSON or a network or storage protocol.

In some implementations, the second machine learning model 216 obtains a set of RF data 204 along with a set of parameters describing various aspects of the RF data 204—e.g., the parameters 212A or 212B. The digital signal processing 214 and 220 can perform the same or similar digital signal processing routines using the RF data 204 and the parameters 212. Output of the digital signal processing 214 and 220 can be processed by the second machine learning model 216. Output from the second machine learning model 216 can be generated by one or more network heads—e.g., the network heads 218 or 224. The network heads 218 or 224 can include one or more classifier or regression heads. The network heads 218 or 224 can determine one or more aspects about different data-dimensions of an input RF data signal included in the RF data 204.

In some implementations, the network heads 218 or 224 include one or more classifier heads. For example, the one or more classifier heads can provide a class estimate for different time-regions within a signal. The signal can be generated by one or more of the digital signal processing 214 or 220. The digital signal processing 214 or 220 can include one or more parametrized digital signal processing routines. The network heads 218 or 224 can include any number of classifier heads. One or more classifier heads can provide a determination between a fixed set of signal classes of a null-set or no-signal present, e.g., in a vector where each value of the vector indicates whether or not a given signal or frequency range is included in the RF data 204. For example, null-set or no-signal present can be generated over a set of different time-windows within an input signal that is provided to one or more instances of the second machine learning model 216.

In some implementations, the network heads 210 include one or more regression heads. Each regression head can correspond to various offsets within dimensions of an input RF signal. Offsets can include one or more of frequency offsets, time offsets, time-frequency offsets, angular offsets, spatial offsets, or any other offsets in the RF signal. The regression heads can determine regressed and predicted values corresponding to a particular region assigned to them in a given signal dimension. In some implementations, the network heads 210 include one or more classifier heads. The classifier heads can be used for each region within a signal space. The classifier heads can determine, directly, which classes of signal, modulations, signal types, protocol types, technology types, signal modes or versions, or vendors, or specific devices may be present in a corresponding region based on outputs such as a softmax, series of other outputs determining a classification, a likelihood or pseudo-likelihood or any linearly or non-linearly related value. Output from the network heads 210 can be provided to an output processing module, which may perform one or more digital signal processing routines, or directly to an output or metadata protocol. A metadata protocol can include signal metadata such as a SIGMF standard as a JSON representation.

In some implementations, the RF processing 206 includes a series of zero or more transformation or preprocessing or feature extraction routines. In some implementations, the first machine learning model 208 is a neural network that determines a set of values from a set of regression heads included in the network heads 210. In some implementations, output from one or more regression heads of the network heads 210 is provided to a set of transformer networks. For example, an operating device, such as the processing unit 102 or other device, can provide output from one or more regression heads of the network heads 210 to one or more transformer networks that are configured to transform the RF data 204 or output of the first machine learning model 208 to provide an input to a classifier network. The classifier network can be configured to determine a set of output classification or regressions to determine various properties of the RF data 204 or subsets of the RF data 204 such as signals present therein.

Outputs from regression heads of the network heads 210 can be provided directly or through a transformation such as scaling or remapping or various logic, into a set of transformer modules (not shown). The transformer modules can process an input RF data signal, e.g., of the RF data 204, and provide an output RF data signal representing a signal of the RF data 204. The output RF data signal can be processed by a secondary network, such as a classifier network, or a regression network. The processes of (i) processing of a portion of the RF data 204 (either processed or raw) by the first machine learning model 208, (ii) transformation, and (iii) processing by a classifier network can be differentiable towards a loss function such as a supervised loss function. The supervised loss function can include one or more values representing ground truth output for the classifier network of step (iii)—e.g., class, signal-type, or modulation label. The processes of (i), (ii), and (iii) can be trained, e.g., by an operating device, such as the processing unit 102 of FIG. 1, through back-propagation as a single process and a single coherent process through a whole set of networks, signal processing, transformation tasks, or neural network processes.

In some implementations, the network heads 210 include one or more regression heads. In some implementations, the RF processing 206 includes a series of zero or more transformation or preprocessing or feature extraction routines. In some implementations, the first machine learning model 208 is configured to determine a set of values from a set of regression heads of the network heads 210. In some implementations, regression heads of the network heads 210 are not uniformly or otherwise spaced over dimensions of an input signal. For example, regression heads of the network heads 210 may not be spaced at regular frequency offsets for determining one or more values representing signals in the RF data 204. Instead, regression heads of the network heads 210 can each process the full range of inputs within a given input data set and produce a set of output regressions or classifications to describe regions of interest in the input RF signal.

In some implementations, training of the first machine learning model 208 or the network heads 210 include using one or more matching algorithms. For example, during training, a set of matching algorithms can be used—e.g., by an operating device such as the processing unit 102—to provide loss-functions to a key or pertinent network heads for output. Key or pertinent heads can be heads that process signals within specific regions of frequency or time space—e.g., that predict if signals are present and at what bandwidth and frequency offsets relative to some frequency bin width. Output heads, otherwise referred to as network heads, can be trained to focus on one or more regions. Phenomena within input signals can be processed by an output processing module to combine and assimilate output regressions and classification about a variety of signals and emissions or other phenomena localized at various locations within the input RF data, e.g., a portion of the RF data 204.

In some implementations, output from one or more regression heads, such as regression heads of network heads 210, 218, or 224, are provided to both a set matching algorithm and output region predictions. For example, an operating device such as the processing unit 102 can determine a loss value per regression head using the set matching algorithm or output region predictions. The operating device can adjust one or more parameters of the one or more regression heads, as realized by the network heads 210, to adjust processing of the first machine learning model 208 or the network heads 210.

In some implementations, a number of regression or classification heads is reduced by associating each head of the network heads 210 with an area of interest or active region rather than with a fixed region along a dimension of an input RF signal. For example, a number of regression or classification heads can be reduced by associating each head with an area of interest or active region, rather than with a fixed region within the RF-Data signal, such as a frequency region, a time region, or a time-frequency region. Naïve approaches such as the latter may assign thousands of regression or classification heads to fixed bands or time-frequency chunks of an input signal.

In contrast, to promote efficient scaling, performance, and resource utilization, a small number of regression heads can be used. The network heads 210, 218, or 224 can be trained, e.g., by a set matching algorithm to identify a set of regions, signals, or phenomenon, or to extract a set of corresponding properties or classifications with a smaller number of processing heads relative to the output number of unique phenomena to be identified, rather than relative to a, perhaps arbitrary, number of steps in an input dimension. During training, a variety of set-matching algorithms, such as the Hungarian algorithm, may be used to help determine which output sets and regions and which regression heads should be combined with which sets of losses and which sets of weighting during training. During training, this allows a smaller set of heads than previously possible to be trained to reach a deterministic and accurate set of predictions based on a variable set of inputs and mixtures of signals or other phenomena in that input signal.

At inference time, the small number of output heads, otherwise referred to as network heads, may then be used to predict how many, what kind, and/or where, signals or phenomena may be occurring within the input signal, or the RF data 204, directly, resulting in reduced complexity and signal processing computational load as compared to an equivalent of per-bin or per-signal-input-dimension spaced set of regression heads. Each head of the network heads 210, 218, or 224 can increase computational resources. Reducing the number of network heads can reduce computational resource requirements, can increase training speed, and generate a more robust network.

In some cases, the output 230 is similar to the output 116 described in reference to FIG. 1. In general, the output 230 can include labels or classification of one or more radio signals or phenomena represented by the RF data 204 based on transmissions from the radio data source 202 or other sources.

Figure 3:
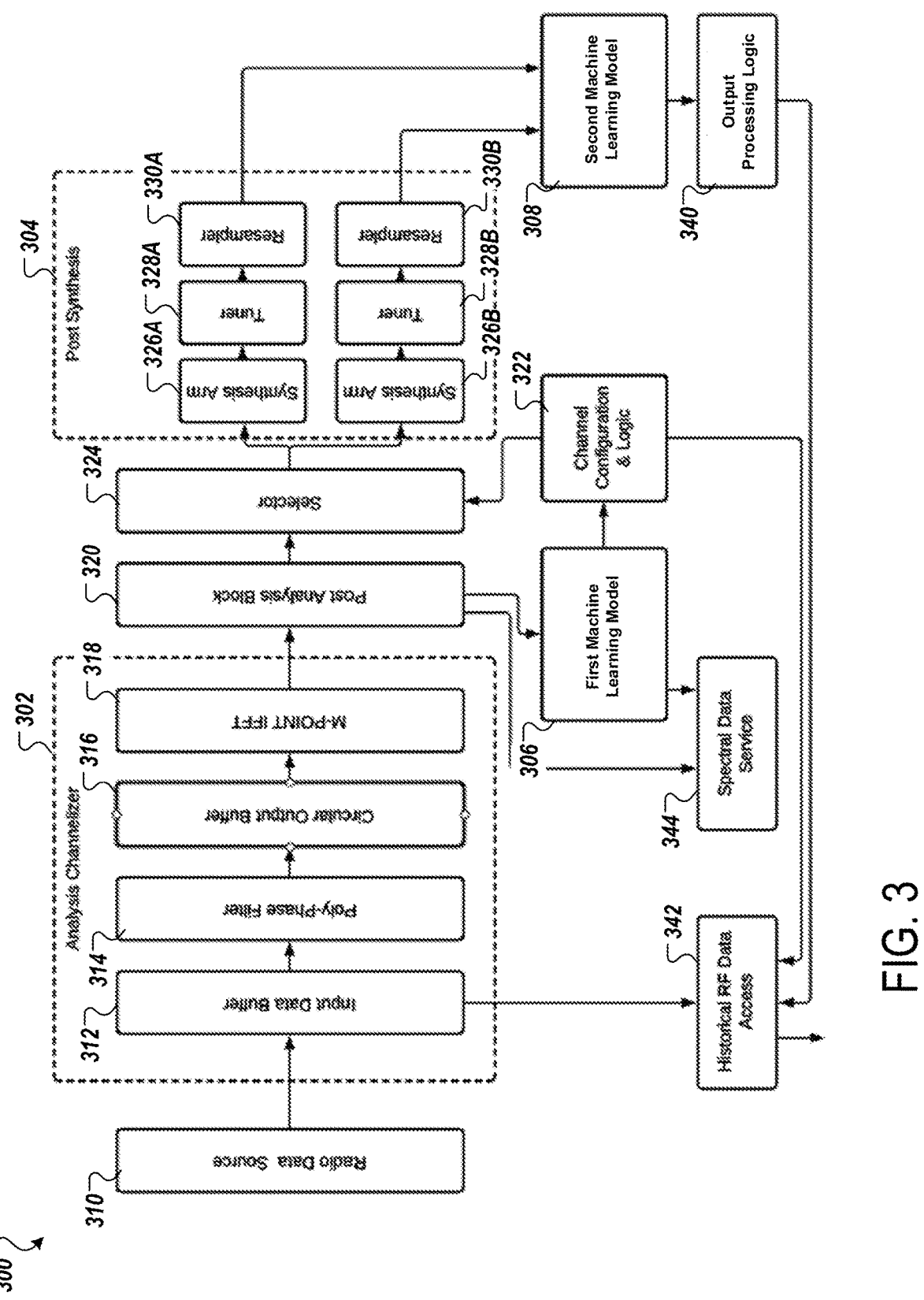
FIG. 3 is a diagram showing an example system for detecting signals using machine learning models as part of signal post analysis.

FIG. 3 is a diagram showing an example system 300 for detecting signals using machine learning models as part of signal post analysis. The system 300 includes an analysis channelizer 302 and a post synthesis bank 304 that are used in conjunction with a first machine learning model 306 and a second machine learning model 308. The first machine learning model 306 and the second machine learning model 308 each implements one or more of machine learning networks. In some implementations, the first and second machine learning models 306 and 308 are similar to, respectively, the first and second machine learning models 107 and 109 described in reference to FIG. 1, or the first and second machine learning models 208 and 216 described in reference to FIG. 2. Operations described in reference to the system 300 can be performed by the processing unit 102 or devices communicably connected to the processing unit 102 described in reference to FIG. 1.

As shown in FIG. 3, the polyphase analysis channelizer 302 includes an input data buffer 312, a poly-phase filter bank 314, a set of circular output buffers 316, and an M-point IFFT or IDFT 318. A radio data source 310 (similar or the same as the radio data source 202) is loaded into the input data buffer 312 and processed by the components of polyphase analysis channelizer 302, which produces a post-analysis set of outputs provided to the post analysis block 320. An output of the post-analysis block 320 is input to the first machine learning model 306.

In some implementations, the first machine learning model 306 generates a set of outputs predicting properties of signals such as pseudo-likelihoods, center frequencies, or bandwidths of signals. Output predictions of the first machine learning model 306 are provided to a channel configuration logic component 322 to configure ephemeral channels or persistent streaming channels, or other such logic which uses output predictions of the first machine learning model 306 to configure a set of channels for the channelizer 302.

In some implementations, the channel configuration logic component 322 configures a selector 324 for a set of synthesis banks or arms, in the post synthesis block 304, to produce a set of output channels. The post synthesis block 304 includes one or more synthesis arms 326A and 326B) of one or more bins from an analysis bank, additional frequency adjustment or tuning provided by tuners 328A-B (which may include multiplication with a sequence such as a complex sinusoid), or additional resampling or interpolation of the sample rate of the output channel provided by re-samplers 330A-B (which may be used to adjust the stream to a specific or desired sample rate). In some implementations, a stream includes a time-series of samples that have been generated by one or more of a synthesis bank, synthesis ARMs, or tuners. A stream can include raw re-assembled sub-bands assembled from a polyphase filter bank. Raw re-assembled sub-bands can be further re-sampled to random, pseudo-random, or other valued rate increments. A stream can include, e.g., for some polyphase filter banks, samples across many window periods in time or one observation window.

In some implementations, output of the post synthesis block 304 is passed to the second machine learning model 308, e.g., to further determine properties of the isolated or channelized signal or output from the channelizer 302. For example, the second machine learning model 308 can predict a modulation type, signal type, an associated standard or version of a signal, a specific device, a device manufacture, or another property of the radio signal or emission which has been channelized. Output of the second machine learning model 308 is, in some cases, processed by a set of output processing logic 340. The output processing logic 340 can, for example, combine, average, aggregate, lookup, or otherwise process output of the second machine learning model 308.

In some implementations, output processing logic 340 generates messages onto an attached message bus, a file or stream-based output message, such as a JSON or SIGMF record. In some cases, the output processing logic 340, or generated output, can trigger an event such as an API call, a warning message, an adjustment of a radio, display or transmitter, or modem setting. In some cases, this may trigger an event that retrieves historical RF data access, e.g., item 342 shown in FIG. 3. For example, if a signal is detected (e.g., by the processing unit 102 described in reference to FIG. 1), triggering a historical data access 342 may schedule reading or processing of that signal or another signal occurring at an earlier or later time in an historical data buffer or input data buffer. This processing can be useful, for example, when detecting a signal to obtain an earlier version of that signal in time, such as when it originally turned on or other earlier signal.

Historical data can be fed into additional machine learning models or, in some cases, historical data can be fed into a modem or protocol processing application. In some cases, historical data processing can trigger recording, storage, or network transmission of a signal or signal records from a system. External processes or triggers, such as external APIs or user interface actions, can trigger actions in the historical RF data access services, e.g., recording or passing contents here from or to other protocol processing applications or signal processing routines.

A spectral data service, e.g., spectral data service 344, can use output of an analysis filter bank, e.g., included in the analysis channelizer 302 or the post analysis block 320. In some implementations, the spectral data service 344 uses output of the post analysis block to determine estimates of power spectral density or another related frequency representation of the signal passing through the channelizer 302. In some cases, estimates of power spectral density or another related frequency representation of the signal passing through the channelizer 302 can be provided immediately or historically to the first machine learning model 306 or to the spectral data device 344, which, for example, may be used for graphical displays of the radio frequency spectrum in the form of power spectral densities, spectrograms, or similar.

In some implementations, graphical displays of the radio frequency spectrum in the form of power spectral densities, spectrograms, or similar are provided with results from the first machine learning model 306, the second machine learning model 308, or output processing logic 340. For example, output similar to the output 116 described in reference to FIG. 1 or the output 230 described in reference to FIG. 2, can be represented using a JSON or SIGMF record associated with a spectrogram.

Structuring a first and second machine learning model integrated within a polyphase channelizer and synthesizer, or similar transformation, can be a powerful architecture that can be used to sense RF spectrum, acoustic spectrum, optical spectrum, or other natural domains over a variety of wired or wireless media. Because polyphase channelization is a highly efficient computational method for channelization, reducing complexity and computational load for both the production of frequency domain representations of signals as well as extracted sub-bands from within those signals, and the first and second machine learning models 306 and 308 can be extremely computationally efficient in interpreting time and frequency domain signals, the combination of polyphase channelization and the first and second machine learning models 306 and 308 into the joint polyphase machine learning signal identification, estimation, separation, and recognition system shown in FIG. 3, presents a state of the art new method for efficiently identifying, separating, recognizing, and processing, a wide range of signals in mixed signal environments.

The system 300 can be realized using a range of computational platforms using digital logic, e.g., including FPGAs, CPUs, vector instructions, tensor operations, GPUs, NPUs, TPUs, DSPs, or custom ASICs. In some cases, a system or processing element performing operations described in reference to FIG. 3 can be implemented in a mix of CPU and GPU systems, where input radio data signals can be sent over a bus such as Ethernet, PCIe, or USB to a memory, wherein polyphase filters or channelizers obtain signals from memory and digitally process signals.

Input radio signals, such as the RF data 204 of FIG. 2 or the communications data 11 of FIG. 1, may be obtained from various RF sources, e.g., including a radio such as a software defined radio (SDR), an embedded radio frequency integrated circuit (RFIC) chip, radio receiver board, telecom front-haul protocol carrying radio data, VITA49 stream, SIGMF file, or other similar stream or file format, among others. A system performing operations described in reference to FIG. 3 can be placed in locations such as on cell towers, in mobile radios or mobile personal communications equipment such as cellular user equipments (UEs), on surveillance towers or turrets, mounted on towers, buildings or poles, or carried on autonomous or manned vehicles such as unmanned drones or UAVs.

FIG. 4 is a flow diagram illustrating an example of a process 400 for detecting frequency bands that correspond to likely radio signals using machine learning models. The process 400 can be performed by one or more processing elements, such as the processing unit 102 described in reference to FIG. 1.

The process 400 includes obtaining communications data comprising one or more radio signals (402). For example, as described in reference to FIG. 1, the processing unit 102 obtains the communications data 111. Similar communications data can be obtained by the processing unit 102 performing operations to generate the RF data 204 described in reference to FIG. 2 or to provide the radio data source 310 to the input data buffer 312 described in reference to FIG. 3.

The process 400 includes providing the communications data to a first machine learning model that is trained to detect frequency bands that likely include radio signals (404). For example, the processing unit 102 can provide the transformed data 112 to the frequency band engine 106 that includes the first machine learning model 107. The transformed data 112 can be included in the communications data 111. The transformed data 112 can be a transformed version of the communications data 111 as described in this document.

The process 400 includes obtaining information representing one or more bands of frequency that correspond to likely radio signals in the communications data as an output generated by the first machine learning model processing the communications data (406). For example, the processing unit 102 can obtain the separated signals 114. The separated signals 114 can include information representing one or more bands of frequency that correspond to likely radio signals in the communications data. The likely radio signals can be one or more data signals, e.g., signals 114A-D, transmitted from the devices 110A-C described in reference to FIG. 1 as RF transmitting devices.

FIG. 5 is a flow diagram illustrating an example of a process for detecting one or more properties of a radio signal using machine learning models. The process 500 can be performed by one or more processing elements, such as the processing unit 102 described in reference to FIG. 1.

The process 500 includes obtaining communications data comprising one or more radio signals (502). For example, as described in reference to FIG. 1, the processing unit 102 obtains the communications data 111. Similar communications data can be obtained by the processing unit 102 performing operations to generate the RF data 204 described in reference to FIG. 2 or to provide the radio data source 310 to the input data buffer 312 described in reference to FIG. 3.

The process 500 includes providing at least a portion of the communications data to a machine learning model that is trained to detect one or more features of radio signals (504). For example, the processing unit 102 can provide the separated signals 114 to signal feature detection engine 108 include the second machine learning model 109. The portion of the communications data can be transformed, extracted, or isolated before being processed by the machine learning model that is trained to detect one or more features of radio signals, e.g., the second machine learning model 109.

The process 500 includes obtaining output of the machine learning model, wherein the output is generated by the machine learning model based on processing the portion of the communications data provided to the machine learning model (506). For example, the processing unit 102 can obtain the output 116. The output 116 can include data generated from one or more network heads, such as the network heads 218 or 224, representing regressed values or classifications of the portion of the communications data, e.g., the separated signals 114.

Processes 400 and 500 of FIGS. 4 and 5 illustrate techniques for processing radio signals. Additionally or alternatively, in some implementations, the techniques can include obtaining a first RF signal, obtaining one or more output values or regressions from a first machine learning model, combining (e.g., using a processing stage) outputs from the first machine learning model and providing a set of parameters used by a set of signal processing routines to obtain a second signal. The processes can include providing such a second signal to a second machine learning model, obtaining a set of properties or classification such as a signal classification as output from the second machine learning model. A first signal, such as a signal included in the communications data 111, can be obtained, for example, from a plurality of possible signal sources, such as transmitting devices 110A-C. The first signal can be processed through a number of pre-processing, domain transforms, or feature extraction routines to provide an input into a first machine learning model, such as the processing unit providing the transformed data 112 to the first machine learning model 107 of the frequency band engine 106.

A first machine learning model, such as the first machine learning model 107, can determine a set of parameters or values corresponding to various aspects of signals of phenomenon within an original RF signal, as described in reference to the parameters 212 described in reference to FIG. 2. Parameters can be passed to a signal processing stage in order to isolate, filter, tune, channelize, time-isolate, or otherwise process the original signal to obtain a second signal. This second signal may then be processed through a second machine learning model, e.g., the second machine learning model 109, 216, or 308, to obtain a set of second classifications or properties of the signal, e.g., signal class, protocol, modulation, type, device, manufacture, specific identity, or a range of other identifiable properties of the phenomenon in the signal. The second classifications or properties can be included in the output 116, 230, or output of the process described in reference to FIG. 3.

Figure 6:
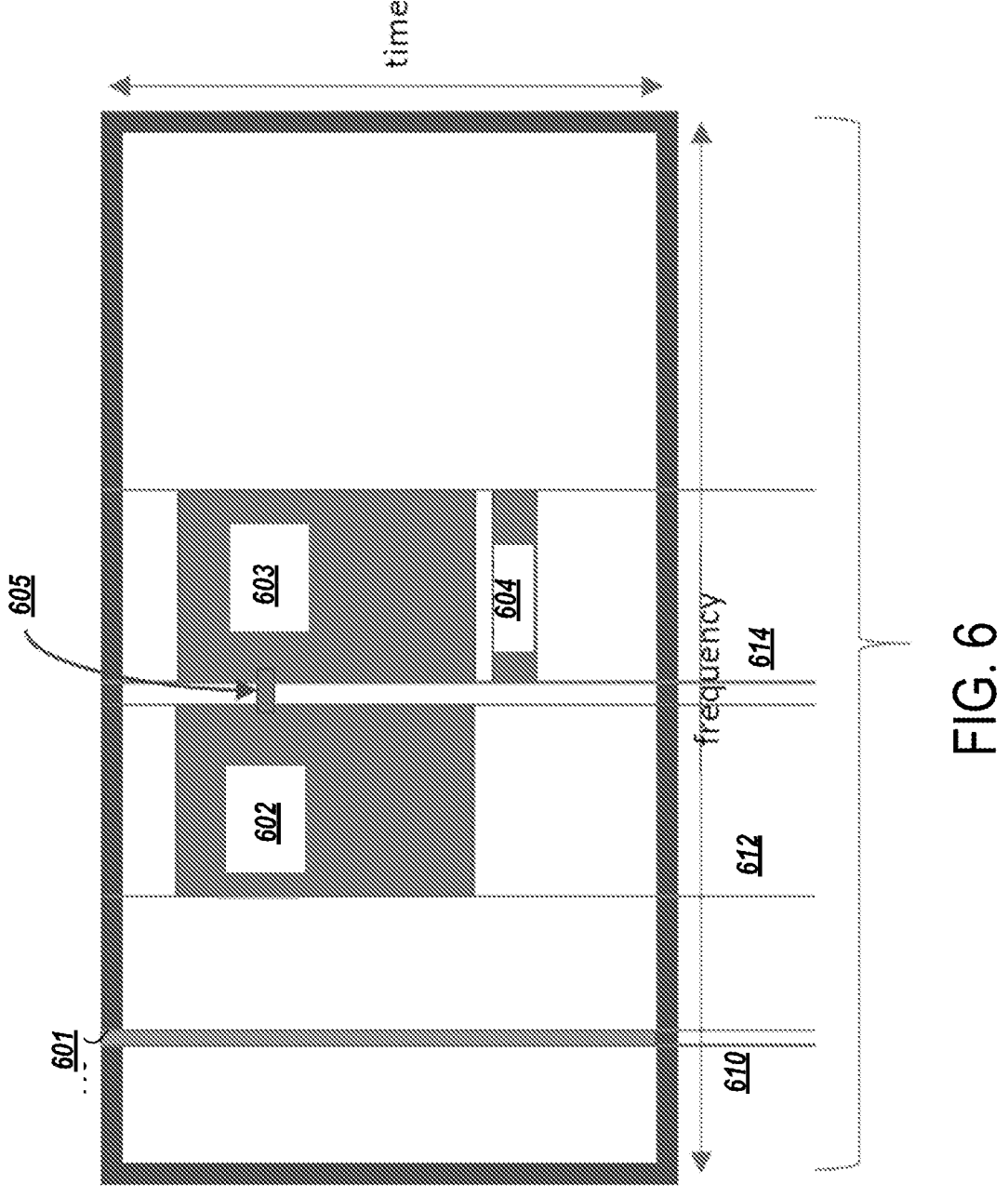
FIG. 6 is an example of a sampled spectrum displayed across time and frequency.

FIG. 6 is an example of a sampled spectrum displayed across time and frequency. There are 5 distinct objects 601-5 that form 3 spectral regions of interest (e.g., 610, 612, and 614). FIG. 6 illustrates an example of a single RF data input that has 5 unique contributing signals of interest 601-5 within background noise, and which form 3 frequency regions of interest 610, 612, and 614 in which they are included. The example shows input that can be provided to a first machine learning model (such as the first machine learning model 107 among other examples of such a machine learning model) which may be in time, frequency, or time-frequency representation. The first machine learning model can generate output representing 3 distinct sets of frequency bands represented graphically by 610, 612, and 614 and corresponding sets of parameters that include contents or other detections to be further processed or included in output.

Figure 7:
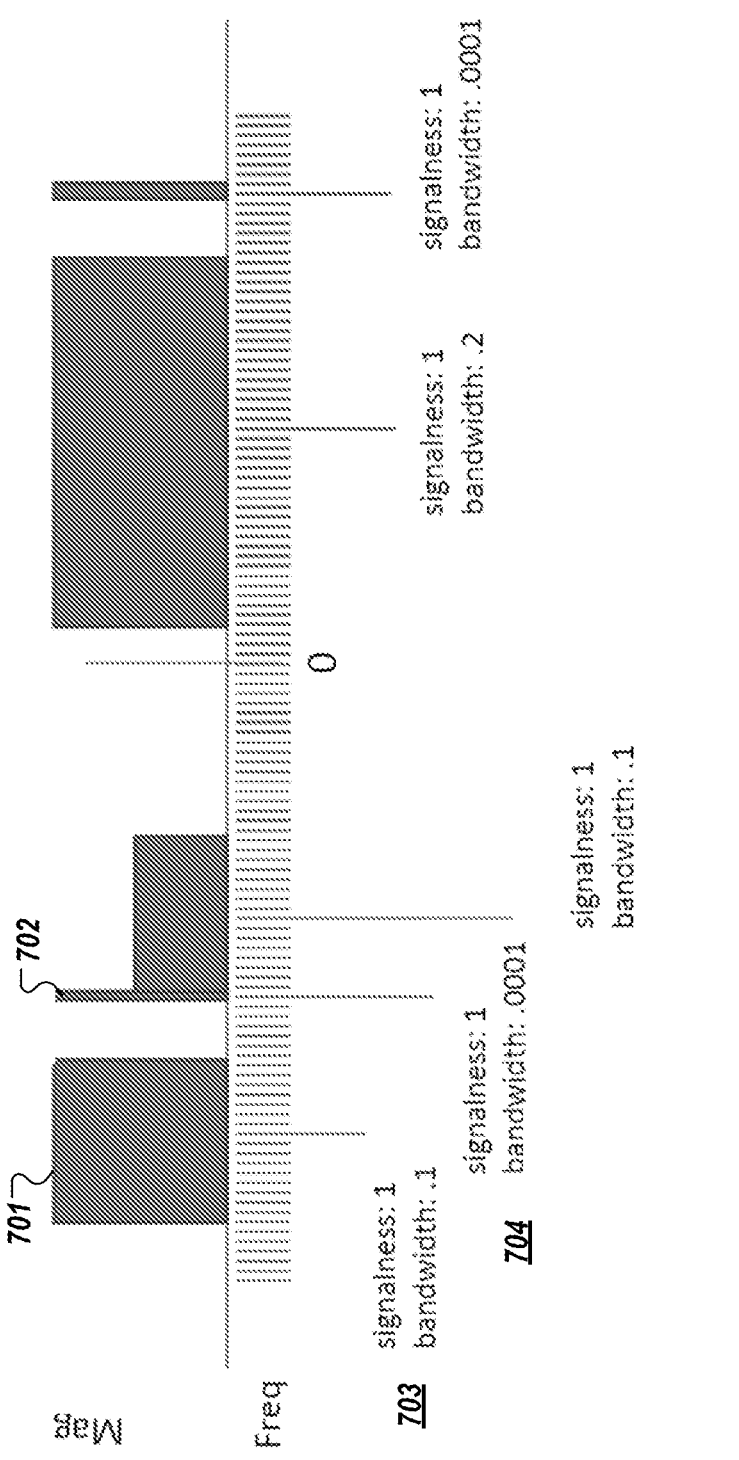
FIG. 7 is an example of a sampled signal using spectral regions of interest.

FIG. 7 is an example of a sampled signal using spectral regions of interest. FIG. 7 illustrates an example where a sampled signal, e.g., one or more signals processed from the communications data 111, is viewed using spectral regions of interest. The spectrum is discretized into bins (e.g., 701, 702) with predictions for each bin. The predictions can vary depending on a specific task. A first machine learning model can include two sets of regression heads for each frequency offset for identifying spectral regions of interest and can produce two elements (e.g., as shown by 703, 704) of each bin: signalness (e.g., a value related to how likely it is that a signal is present) and bandwidth (e.g., a value relative to what the width of a signal is in Hz). Signalness can be used to indicate that there is a spectral region of interest within a given bin. Bandwidth can be used to indicate a size of the region.

Additional parameters that can be output include an adjustment factor to the spectral bin to regress a specific continuous frequency center rather than a discretized frequency center. Given multiple apertures, each spectral region can allow for regressing an array factor that can either be used to optimally combine samples from each aperture to maximize signal to noise ratio (SNR) for further processing, or estimate a direction of arrival. FIG. 7 shows an example of an input and the output values for a first machine learning model and a set of output regression values that may be used directly or combined, processed, averaged, filtered, or otherwise modified before being provided in output information, or be used by a set of digital signal processing routines to produce a set of inputs for a set of second machine learning models, such as the second machine learning model 109.

Figure 8:
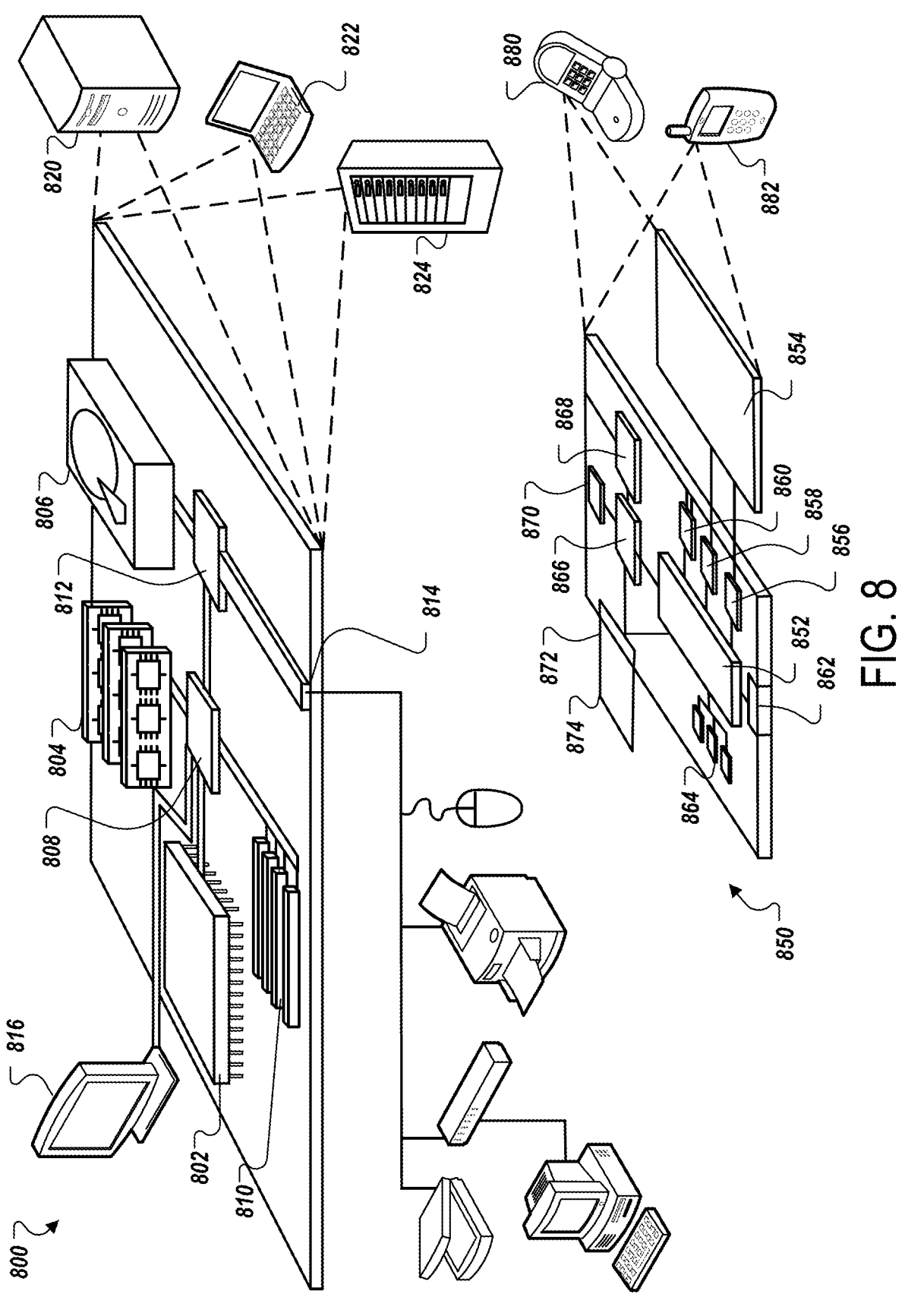
FIG. 8 is a diagram illustrating an example of a computing system used for processing digital communications using a machine learning model.

FIG. 8 is a diagram illustrating an example of a computing system used for processing digital communications using a machine learning model. The computing system includes computing device 800 and a mobile computing device 850 that can be used to implement the techniques described herein. For example, one or more components of the system 100 could be realized using the computing device 800 or the mobile computing device 850, such as a computer system implementing the processing unit 102, devices that access information from the processing unit 102, or a server that accesses or stores information regarding the operations performed by the processing unit 102.

The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 802 is a single threaded processor. In some implementations, the processor 802 is a multi-threaded processor. In some implementations, the processor 802 is a quantum computer.

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine readable mediums (for example, the memory 804, the storage device 806, or memory on the processor 802). The high-speed interface 808 manages bandwidth-intensive operations for the computing device 800, while the low-speed interface 812 manages lower bandwidth-intensive operations. Such allocation of functions is an example only. In some implementations, the high speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device, such as a mobile computing device 850. Each of such devices may include one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may include appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry in some cases. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 868 using a radio frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, among others) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube), LCD (liquid crystal display), or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for processing radio signals using one or more neural networks, the method comprising:

obtaining communications data corresponding to one or more radio signals;

providing the communications data to a first machine learning model that is trained to detect one or more frequency bands that likely include radio signals;

obtaining, as an output of the first machine learning model, information representing one or more frequency bands that correspond to likely radio signals in the communications data, wherein the information representing the one or more frequency bands is generated by the first machine learning model by processing the communications data;

providing at least a portion of the communications data corresponding to the obtained one or more frequency bands to a second machine learning model that is trained to detect one or more features of radio signals; and obtaining, as an output of the second machine learning model, a signal classification corresponding to the obtained one or more frequency bands, wherein the signal classification is generated by the second machine learning model based on processing the portion of the communications data provided to the second machine learning model.

2. The method of claim 1, wherein generating the information representing the one or more frequency bands by the first machine learning model by processing the communications data comprises:

processing, by the first machine learning model, the communications data using one or more regression heads.

3. The method of claim 2, wherein processing, by the first machine learning model, the communications data using the one or more regression heads comprises:

processing, by the first machine learning model, the communications data using one or more fully connected layers in the one or more regression heads to predict a likelihood that a particular frequency band likely include radio signals.

4. The method of claim 2, wherein training the one or more regression heads comprises:

comparing a predicted set of frequency bands that likely include radio signals to a known set of frequency bands that include radio signals using a set matching algorithm.

5. The method of claim 4, wherein training the one or more regression heads comprises:

minimizing a difference between the predicted set of frequency bands that likely include radio signals to the known set of frequency bands that include radio signals.

6. The method of claim 1, further comprising:

determining, by the first machine learning model using one or more classifier heads, a class of each radio signal of the radio signals.

7. The method of claim 1, further comprising:

providing features associated with the one or more radio signals to the second machine learning model with the portion of the communications data, wherein the features include one or more of a center frequency, bandwidth, confidence value, or signal strength.

8. The method of claim 1, wherein obtaining the communications data corresponding to the one or more radio signals comprises:

obtaining data representing in-phase and quadrature signals demodulated from a received radio signal of the one or more radio signals.

9. The method of claim 1, further comprising:

generating the portion of the communications data by performing one or more of the following signal processing on the communications data: normalization, scaling, filtering, tuning, decimation, resampling, adjustment, transformation, channelization, or feature extraction.

10. The method of claim 1, wherein generating the signal classification by the second machine learning model by processing at least the portion of the communications data comprises:

processing, by the second machine learning model, the portion of the communications data using one or more classifier heads to determine a signal classification of each radio signal in the one or more radio signals.

11. One or more non-transitory computer storage media encoded with computer program instructions that when executed by one or more computers cause the one or more computers to perform operations comprising:

obtaining communications data corresponding to one or more radio signals;

providing the communications data to a first machine learning model that is trained to detect one or more frequency bands that likely include radio signals;

obtaining, as an output of the first machine learning model, information representing one or more frequency bands that correspond to likely radio signals in the communications data, wherein the information representing the one or more frequency bands is generated by the first machine learning model by processing the communications data;

providing at least a portion of the communications data corresponding to the obtained one or more frequency bands to a second machine learning model that is trained to detect one or more features of radio signals; and obtaining, as an output of the second machine learning model, a signal classification corresponding to the obtained one or more frequency bands, wherein the signal classification is generated by the second machine learning model based on processing the portion of the communications data provided to the second machine learning model.

12. The media of claim 11, wherein generating the information representing the one or more frequency bands by the first machine learning model by processing the communications data comprises:

processing, by the first machine learning model, the communications data using one or more regression heads.

13. The media of claim 12, wherein processing, by the first machine learning model, the communications data using the one or more regression heads comprises:

processing, by the first machine learning model, the communications data using one or more fully connected layers in the one or more regression heads to predict a likelihood that a particular frequency band likely include radio signals.

14. The media of claim 12, wherein training the one or more regression heads comprises:

comparing a predicted set of frequency bands that likely include radio signals to a known set of frequency bands that include radio signals using a set matching algorithm.

15. The media of claim 14, wherein training the one or more regression heads comprises:

minimizing a difference between the predicted set of frequency bands that likely include radio signals to the known set of frequency bands that include radio signals.

16. The media of claim 11, wherein the operations comprise:

determining, by the first machine learning model using one or more classifier heads, a class of each radio signal of the radio signals.

17. The media of claim 11, wherein the operations comprise:

providing features associated with the one or more radio signals to the second machine learning model with the portion of the communications data, wherein the features include one or more of a center frequency, bandwidth, confidence value, or signal strength.

18. The media of claim 11, wherein obtaining the communications data corresponding to the one or more radio signals comprises:

obtaining data representing in-phase and quadrature signals demodulated from a received radio signal of the one or more radio signals.

19. The media of claim 11, wherein the operations comprise:

generating the portion of the communications data by performing one or more of the following signal processing on the communications data: normalization, scaling, filtering, tuning, decimation, resampling, adjustment, transformation, channelization, or feature extraction.

20. A system, comprising:

one or more computers and one or more storage devices on which are stored instructions that are operable, when executed by the one or more computers, to cause the one or more computers to perform operations comprising:

obtaining communications data corresponding to one or more radio signals;

providing the communications data to a first machine learning model that is trained to detect one or more frequency bands that likely include radio signals;

obtaining, as an output of the first machine learning model, information representing one or more frequency bands that correspond to likely radio signals in the communications data, wherein the information representing the one or more frequency bands is generated by the first machine learning model by processing the communications data;

providing at least a portion of the communications data corresponding to the obtained one or more frequency bands to a second machine learning model that is trained to detect one or more features of radio signals; and obtaining, as an output of the second machine learning model, a signal classification corresponding to the obtained one or more frequency bands, wherein the signal classification is generated by the second machine learning model based on processing the portion of the communications data provided to the second machine learning model.

* * * * *